(12) United States Patent
Shih

(10) Patent No.: US 7,210,804 B2
(45) Date of Patent: May 1, 2007

(54) WIDE-ANGLE MIRROR WITH PRESS STRIPS

(76) Inventor: Yi-Cyuan Shih, 58, Ma Yuan West St., Taichung (TW)

( * ) Notice: Subject to any disclaimer, the term of this patent is extended or adjusted under 35 U.S.C. 154(b) by 0 days.

(21) Appl. No.: 11/209,061

(22) Filed: Aug. 23, 2005

(65) Prior Publication Data

US 2007/0047114 A1    Mar. 1, 2007

(51) Int. Cl.
G02B 7/18    (2006.01)

(52) U.S. Cl. .................. 359/871; 248/475.1

(58) Field of Classification Search ........ 359/871–872; 248/466, 468, 474, 481, 488
See application file for complete search history.

(56) References Cited

U.S. PATENT DOCUMENTS

| | | | | |
|---|---|---|---|---|
| 3,205,777 A | * | 9/1965 | Brenner | 248/480 |
| 3,316,052 A | * | 4/1967 | Ross | 359/872 |
| 3,448,553 A | * | 6/1969 | Mahler et al. | 359/883 |
| 3,563,638 A | * | 2/1971 | Panozzo | 359/864 |
| 3,603,555 A | * | 9/1971 | Lohr | 248/481 |
| 5,084,785 A | * | 1/1992 | Albers et al. | 359/868 |
| 5,909,327 A | * | 6/1999 | Liu | 359/872 |
| 6,070,984 A | * | 6/2000 | Kusik | 359/872 |
| 2003/0007265 A1 | * | 1/2003 | Norman | 359/871 |

FOREIGN PATENT DOCUMENTS

| | | | |
|---|---|---|---|
| EP | 284490 A1 | * | 9/1988 |
| FR | 2080055 | * | 11/1971 |
| GB | 1224523 A | * | 10/1971 |
| GB | 1572746 A | * | 8/1980 |

* cited by examiner

*Primary Examiner*—Drew A. Dunn
*Assistant Examiner*—Mark Consilvio
(74) *Attorney, Agent, or Firm*—Alan D. Kamrath; Nikolai & Mersereau, P.A.

(57) ABSTRACT

A wide-angle mirror includes a back plate having an inner side formed with an annular support flange having an outer side formed with a stop ring, a mirror plate having an inner side rested on the annular support flange of the back plate and a rim rested on the stop ring of the back plate, and a plurality of press strips secured to the back plate and rested on the mirror plate. Thus, the press strips are snapped onto the back plate and rested on the mirror plate to retain the mirror plate on the back plate, so that the wide-angle mirror is assembled easily and rapidly.

17 Claims, 5 Drawing Sheets

WIDE-ANGLE MIRROR WITH PRESS STRIPS

BACKGROUND OF THE INVENTION

1. Field of the Invention

The present invention relates to a wide-angle mirror, and more particularly to a wide-angle mirror having enhanced structural strength and reflective effect and having an outstanding outer appearance.

2. Description of the Related Art

A wide-angle mirror is mounted on a site, such as a turning section of a road or parking lot, a supermarket, a factory or the like, so as to provide a better viewing angle, thereby preventing occurrence of traffic accidents, and thereby providing a monitoring effect.

A conventional wide-angle mirror in accordance with the prior art was disclosed in the Taiwanese Patent Publication No. 340632, 356247, 433298 and 475617. However, the above-mentioned conventional wide-angle mirror has the following disadvantages. The wide-angle mirror has too many components, thereby causing inconvenience in assembly of the wide-angle mirror, and thereby increasing costs of fabrication. In addition, the back face of the back plate has a plurality of recessed portions to reinforce the strength thereof, thereby decreasing the aesthetic quality of the wide-angle mirror. Further, the mirror plate is easily distorted or deformed due to compression, thereby greatly decreasing the reflective effect of the mirror plate. Further, the wide-angle mirror has too many components, so that it is difficult to adjust the angle of the wide-angle mirror.

SUMMARY OF THE INVENTION

In accordance with the present invention, there is provided a wide-angle mirror, comprising a back plate having an inner side formed with an annular support flange having an outer side formed with a stop ring, a mirror plate mounted on the inner side of the back plate and having an inner side rested on the annular support flange of the back plate and a rim rested on the stop ring of the back plate, and a plurality of press strips secured to the back plate and rested on the mirror plate to retain the mirror plate on the back plate.

The primary objective of the present invention is to provide a wide-angle mirror, wherein the press strips are snapped onto the back plate and rested on the mirror plate to retain the mirror plate on the back plate, so that the wide-angle mirror is assembled easily and rapidly.

Another objective of the present invention is to provide a wide-angle mirror, wherein the snapping blocks of each of the press strips are hooked on the snapping zone of the catch block and embedded into the catch block to prevent the snapping blocks from being exposed outward, thereby preventing the snapping blocks from hooking and hurting the human body.

A further objective of the present invention is to provide a wide-angle mirror, wherein the reinforcing ribs are provided on the back plate, thereby reinforcing the strength of the back plate.

A further objective of the present invention is to provide a wide-angle mirror, wherein the reinforcing ribs are provided on the inner side of the back plate so that the back plate has a smooth back face, thereby enhancing the aesthetic quality of the wide-angle mirror.

A further objective of the present invention is to provide a wide-angle mirror, wherein the press strips are secured to the back plate and rested on the mirror plate to retain the mirror plate on the back plate, so that the mirror plate will not be distorted or deformed due to compression, thereby enhancing the reflective effect of the mirror plate.

Further benefits and advantages of the present invention will become apparent after a careful reading of the detailed description with appropriate reference to the accompanying drawings.

DETAILED DESCRIPTION OF THE INVENTION

Figure 1:
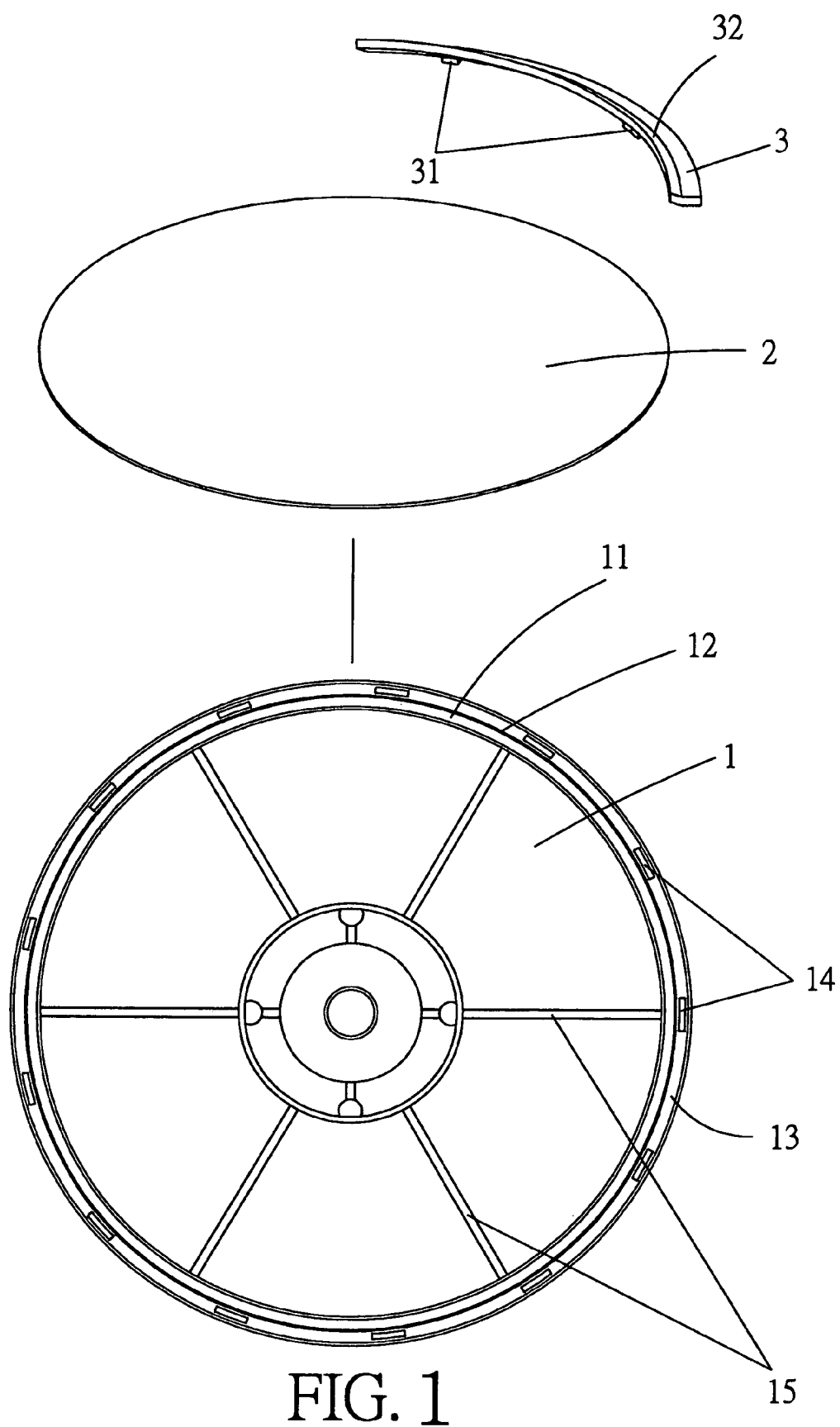
FIG. 1 is an exploded perspective view of a wide-angle mirror in accordance with the preferred embodiment of the present invention.
Figure 2:
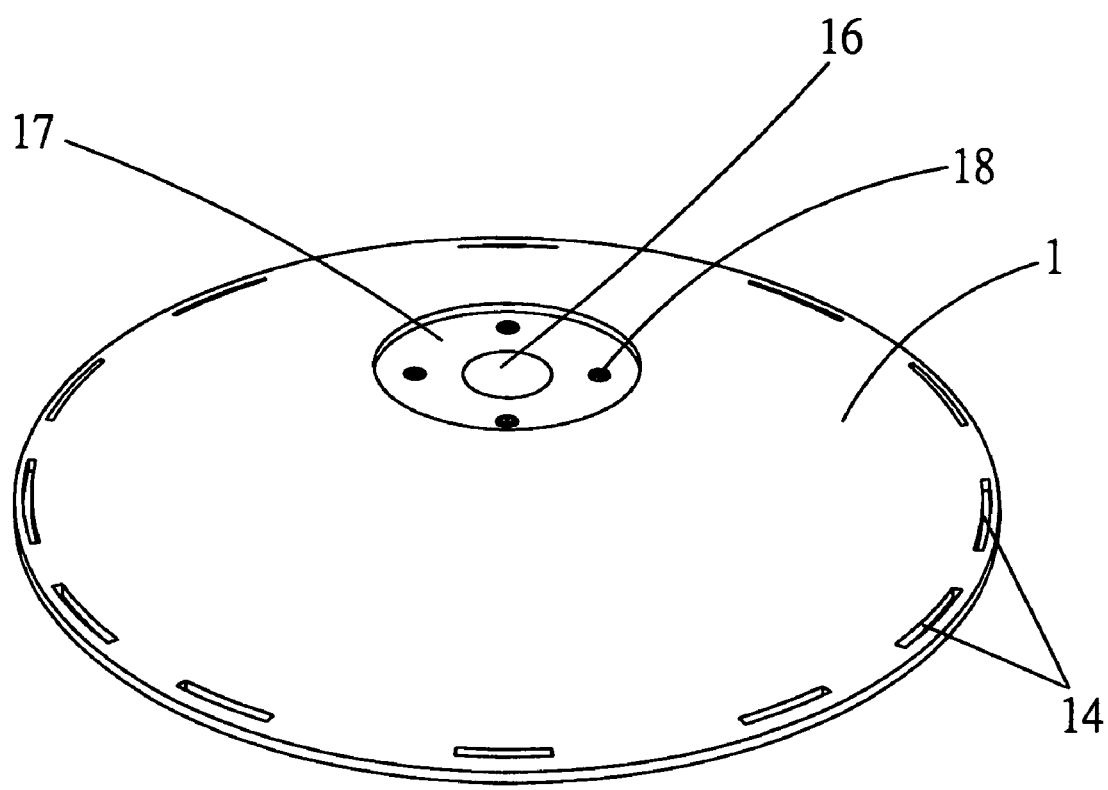
FIG. 2 is a bottom perspective view of the wide-angle mirror in accordance with the preferred embodiment of the present invention.
Figure 3:
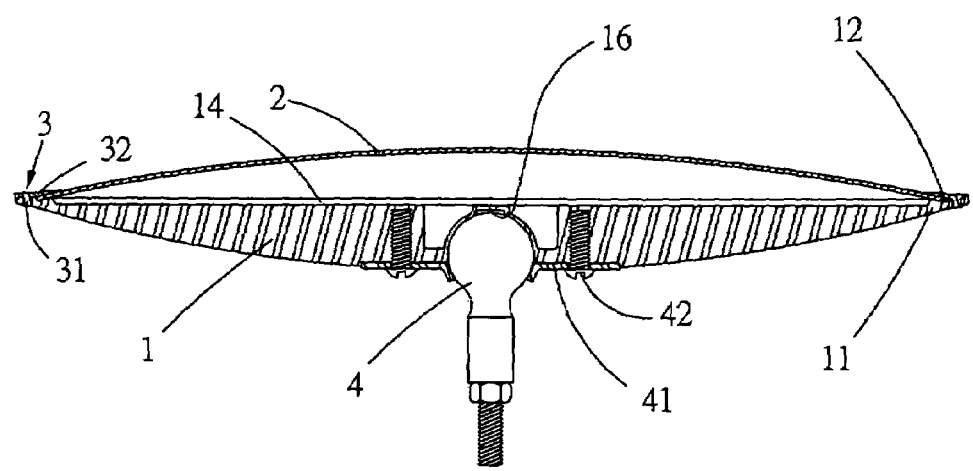
FIG. 3 is a plan cross-sectional assembly view of the wide-angle mirror as shown in FIG. 1.
Figure 4:
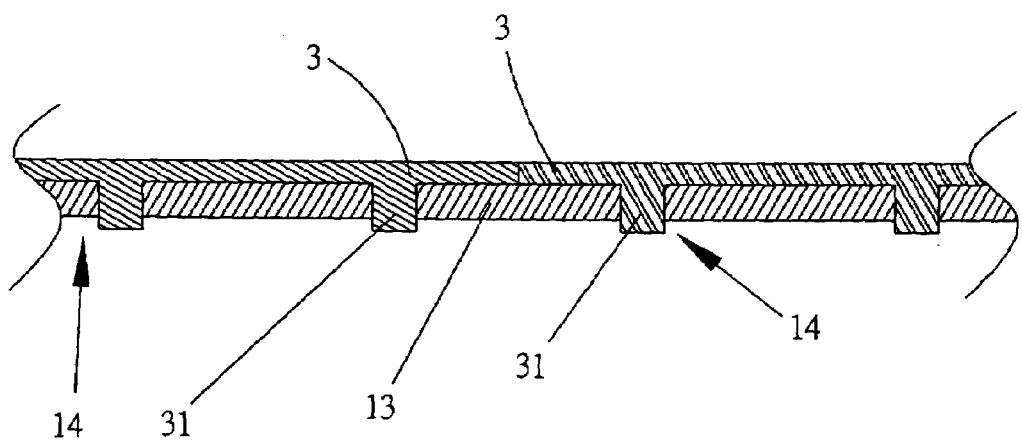
FIG. 4 is a locally enlarged plan cross-sectional assembly view of the wide-angle mirror as shown in FIG. 1.
Figure 5:
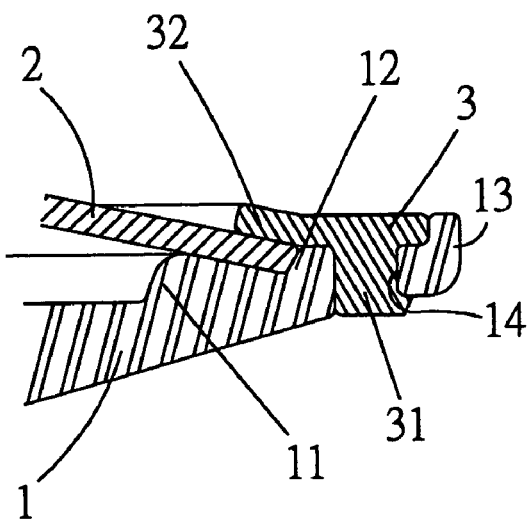
FIG. 5 is a locally enlarged plan cross-sectional assembly view of the wide-angle mirror as shown in FIG. 1.

Referring to the drawings and initially to FIGS. 1–5, a wide-angle mirror in accordance with the preferred embodiment of the present invention comprises a back plate 1, a mirror plate 2, and a plurality of press strips 3.

The back plate 1 has an inner side formed with an annular support flange 11. The annular support flange 11 of the back plate 1 is substantially arc-shaped and has a curvature the same as that of the inner side of the mirror plate 2. The annular support flange 11 of the back plate 1 has an outer side formed with a stop ring 12 having a height the same as the thickness of the mirror plate 2. The back plate 1 has an annular outer rim 13 formed with a plurality of snapping holes 14. The inner side of the back plate 1 has a plurality of reinforcing ribs 15 extended from a central portion of the back plate 1 to the annular support flange 11. The reinforcing ribs 15 of the back plate 1 are arranged in a radiating manner. The back plate 1 has a back face having a central portion formed with a support recess 16. The support recess 16 of the back plate 1 has a periphery formed with a depression 17 having a plurality of locking holes 18.

Each of the press strips 3 is substantially arc-shaped and has a bottom formed with a plurality of snapping blocks 31. Each of the press strips 3 has a front end formed with a slightly upward inclined resting edge 32 having a curvature the same as that of the outer side of the mirror plate 2.

In assembly, the mirror plate 2 is mounted on the inner side of the back plate 1, so that the inner side of the mirror plate 2 is rested on the annular support flange 11 of the back plate 1, and the rim of the mirror plate 2 is rested on the stop ring 12 of the back plate 1. Then, the snapping blocks 31 of each of the press strips 3 are snapped into the snapping holes 14 of the annular outer rim 13 of the back plate 1, and the resting edge 32 of each of the press strips 3 is rested on the outer side of the mirror plate 2. Then, a connector shaft 4 is mounted in the support recess 16 of the back plate 1. Finally, a cover plate 41 is mounted in the depression 17 of the back plate 1 and locked to the locking holes 18 of the back plate 1 by locking screws 42 to cover the connector shaft 4 in the back plate 1.

Figure 6:
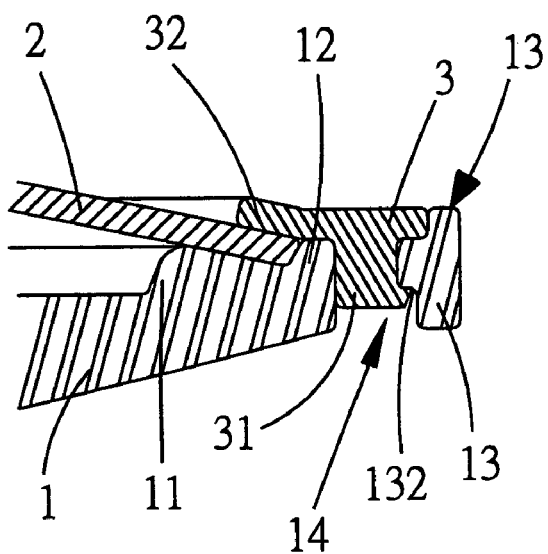
FIG. 6 is a locally enlarged plan cross-sectional assembly view of a wide-angle mirror in accordance with another preferred embodiment of the present invention.

Referring to FIG. 6, the annular outer rim 13 of the back plate 1 has a catch block 131 extended from the back face of the back plate 1. The catch block 131 of the back plate 1 has an inner side formed with a recessed snapping zone 132, so that the snapping blocks 31 of each of the press strips 3 are hooked on the snapping zone 132 of the catch block 131 and embedded into the catch block 131 to prevent the snapping blocks 31 of the press strips 3 from being exposed outward, thereby preventing the snapping blocks 31 of the press strips 3 from hooking and hurting the human body.

Figure 7:
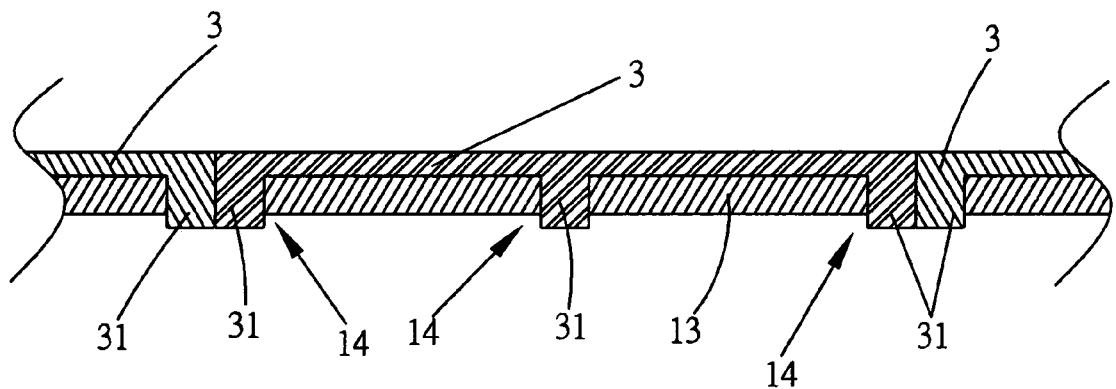
FIG. 7 is a locally enlarged plan cross-sectional assembly view of a wide-angle mirror in accordance with another preferred embodiment of the present invention.
Figure 8:
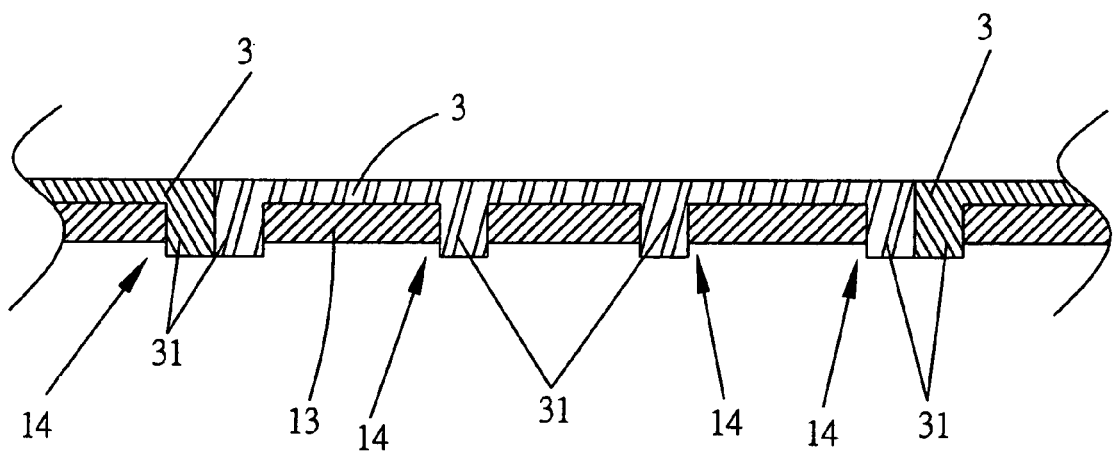
FIG. 8 is a locally enlarged plan cross-sectional assembly view of a wide-angle mirror in accordance with another preferred embodiment of the present invention.

Referring to FIGS. 7 and 8, the snapping holes 14 of the annular outer rim 13 of the back plate 1 have different diameters arranged in a staggered manner. At this time, the snapping blocks 31 of the press strips 3 are arranged to correspond to the diameter and number of the snapping holes 14 of the annular outer rim 13 of the back plate 1. For example, each of the press strips 3 has two opposite ends each provided with a snapping block 31, and the snapping blocks 31 of any two adjacent press strips 3 are juxtaposed to each other and snapped into the same snapping hole 14 of the annular outer rim 13 of the back plate 1. In addition, each of the press strips 3 has at least one snapping block 31 located between the two opposite ends of each of the press strips 3.

Accordingly, the press strips are snapped onto the back plate and rested on the mirror plate to retain the mirror plate on the back plate, so that the wide-angle mirror is assembled easily and rapidly. In addition, the snapping blocks of each of the press strips are hooked on the snapping zone of the catch block and embedded into the catch block to prevent the snapping blocks from being exposed outward, thereby preventing the snapping blocks from hooking and hurting the human body. Further, the reinforcing ribs are provided on the back plate, thereby reinforcing the strength of the back plate. Further, the reinforcing ribs are provided on the inner side of the back plate so that the back plate has a smooth back face, thereby enhancing the aesthetic quality of the wide-angle mirror. Further, the press strips are secured to the back plate and rested on the mirror plate to retain the mirror plate on the back plate, so that the mirror plate will not be distorted or deformed due to compression, thereby enhancing the reflective effect of the mirror plate.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wide-angle mirror, comprising:
    a back plate having an inner side formed with an annular support flange having an outer side formed with a stop ring,
    a mirror plate mounted on the inner side of the back plate and having an inner side rested on the annular support flange of the back plate and a rim rested on the stop ring of the back plate;
    a plurality of press strips secured to the back plate and rested on the mirror plate to retain the mirror plate on the back plate;
    wherein the back plate has an annular outer rim formed with a plurality of snapping holes, and each of the press strips has a bottom formed with a plurality of snapping blocks snapped into the snapping holes of the annular outer rim of the back plate;
    the snapping holes of the annular outer rim of the back plate have different diameters arranged in a staggered manner.

2. The wide-angle mirror in accordance with claim 1, wherein the annular support flange of the back plate is substantially arc-shaped and has a curvature the same as that of the inner side of the mirror plate.

3. The wide-angle mirror in accordance with claim 1, wherein the stop ring of the back plate has a height the same as the thickness of the mirror plate.

4. The wide-angle mirror in accordance with claim 1, wherein the inner side of the back plate has a plurality of reinforcing ribs.

5. The wide-angle mirror in accordance with claim 4, wherein the reinforcing ribs are extended from a central portion of the back plate to the annular support flange.

6. The wide-angle mirror in accordance with claim 4, wherein the reinforcing ribs of the back plate are arranged in a radiating manner.

7. The wide-angle mirror in accordance with claim 1, wherein each of the press strips is substantially arc-shaped.

8. The wide-angle mirror in accordance with claim 1, wherein each of the press strips has a front end formed with a slightly upward inclined resting edge rested on an outer side of the mirror plate.

9. The wide-angle mirror in accordance with claim 8, wherein the resting edge of each of the press strips has a curvature the same as that of the outer side of the mirror plate.

10. The wide-angle mirror in accordance with claim 1, wherein the back plate has a back face having a central portion formed with a support recess, and the wide-angle mirror further comprises a connector shaft mounted in the support recess of the back plate.

11. The wide-angle mirror in accordance with claim 10, wherein the support recess of the back plate has a periphery formed with a depression having a plurality of locking holes, and the wide-angle mirror further comprises a cover plate mounted in the depression of the back plate and locked to the locking holes of the back plate by locking screws to cover the connector shaft in the back plate.

12. The wide-angle mirror in accordance with claim 1, wherein the annular outer rim of the back plate has a catch block extended from the back face of the back plate, the catch block of the back plate has an inner side formed with a recessed snapping zone, and the snapping blocks of each of the press strips are hooked on the snapping zone of the catch block and embedded into the catch block.

13. The wide-angle mirror in accordance with claim 1, wherein the snapping blocks of the press strips are arranged to correspond to the diameter and number of the snapping holes of the annular outer rim of the back plate.

14. The wide-angle mirror in accordance with claim 13, wherein each of the press strips has two opposite ends each provided with a snapping block, and the snapping blocks of any two adjacent press strips are juxtaposed to each other and snapped into the same snapping hole of the annular outer rim of the back plate.

15. The wide-angle mirror in accordance with claim 14, wherein each of the press strips has at least one snapping block located between the two opposite ends of each of the press strips.

16. The wide-angle mirror in accordance with claim 14, wherein each of the press strips has at least two snapping blocks located between the two opposite ends of each of the press strips.

17. The wide-angle mirror in accordance with claim 1, wherein the back plate has a smooth back face.

* * * * *